UNITED STATES PATENT OFFICE.

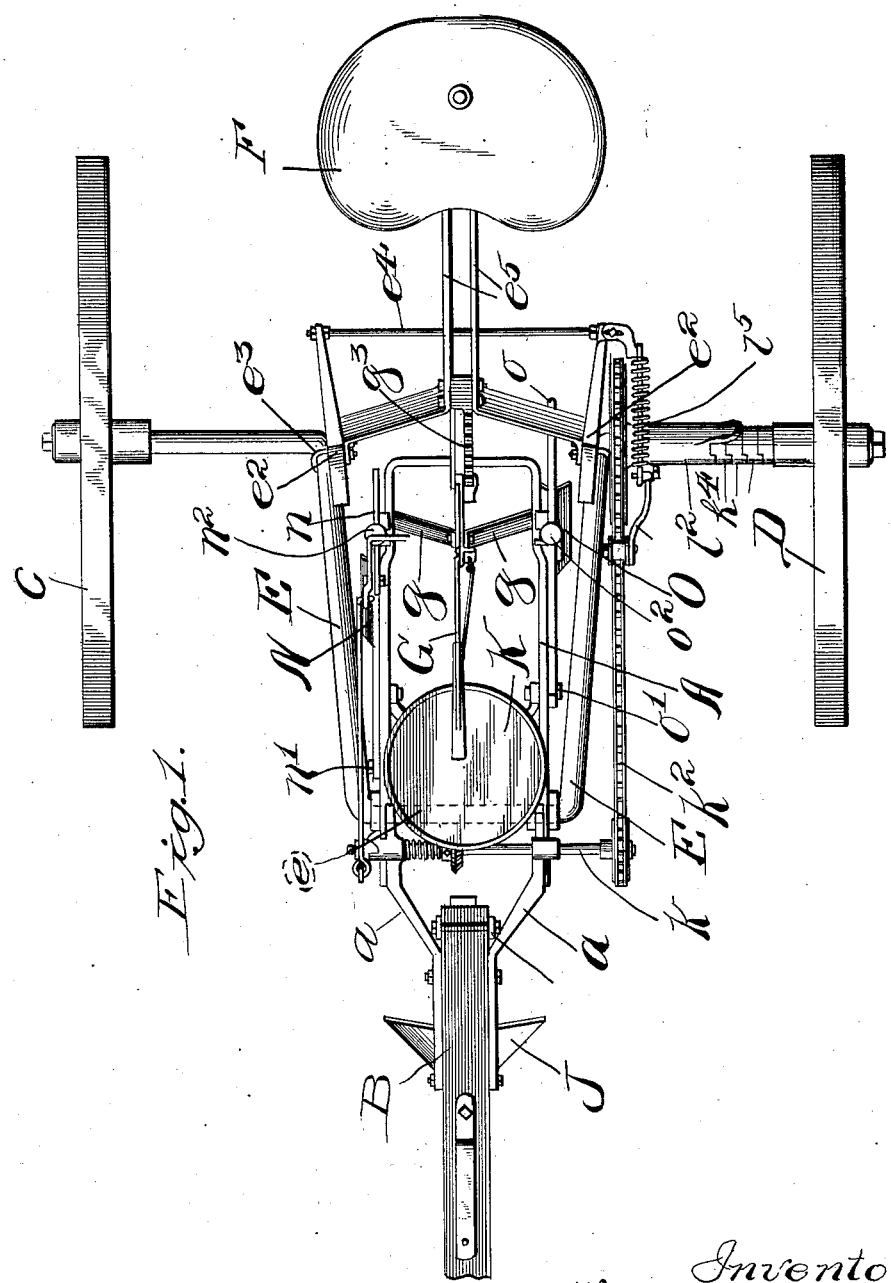

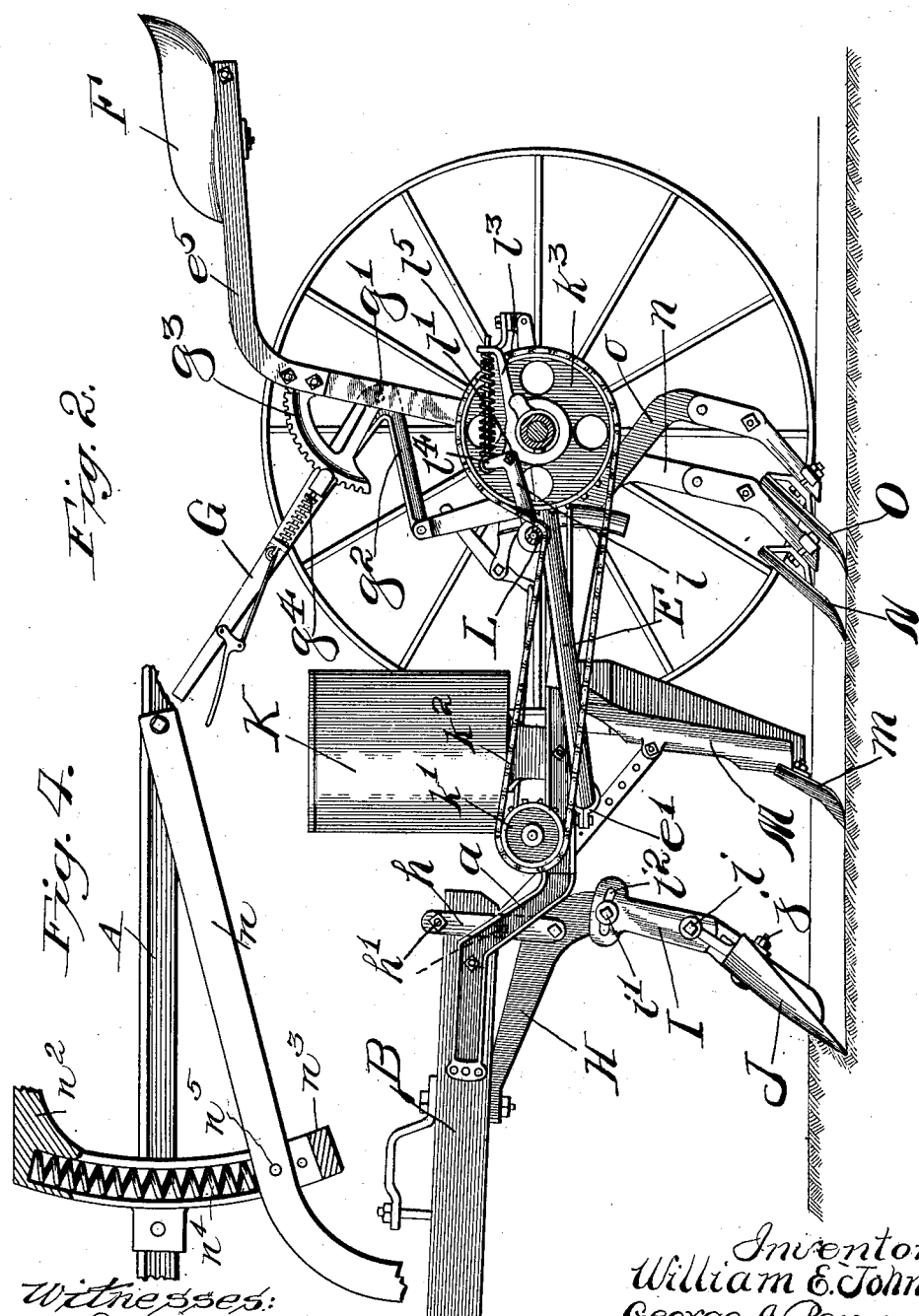

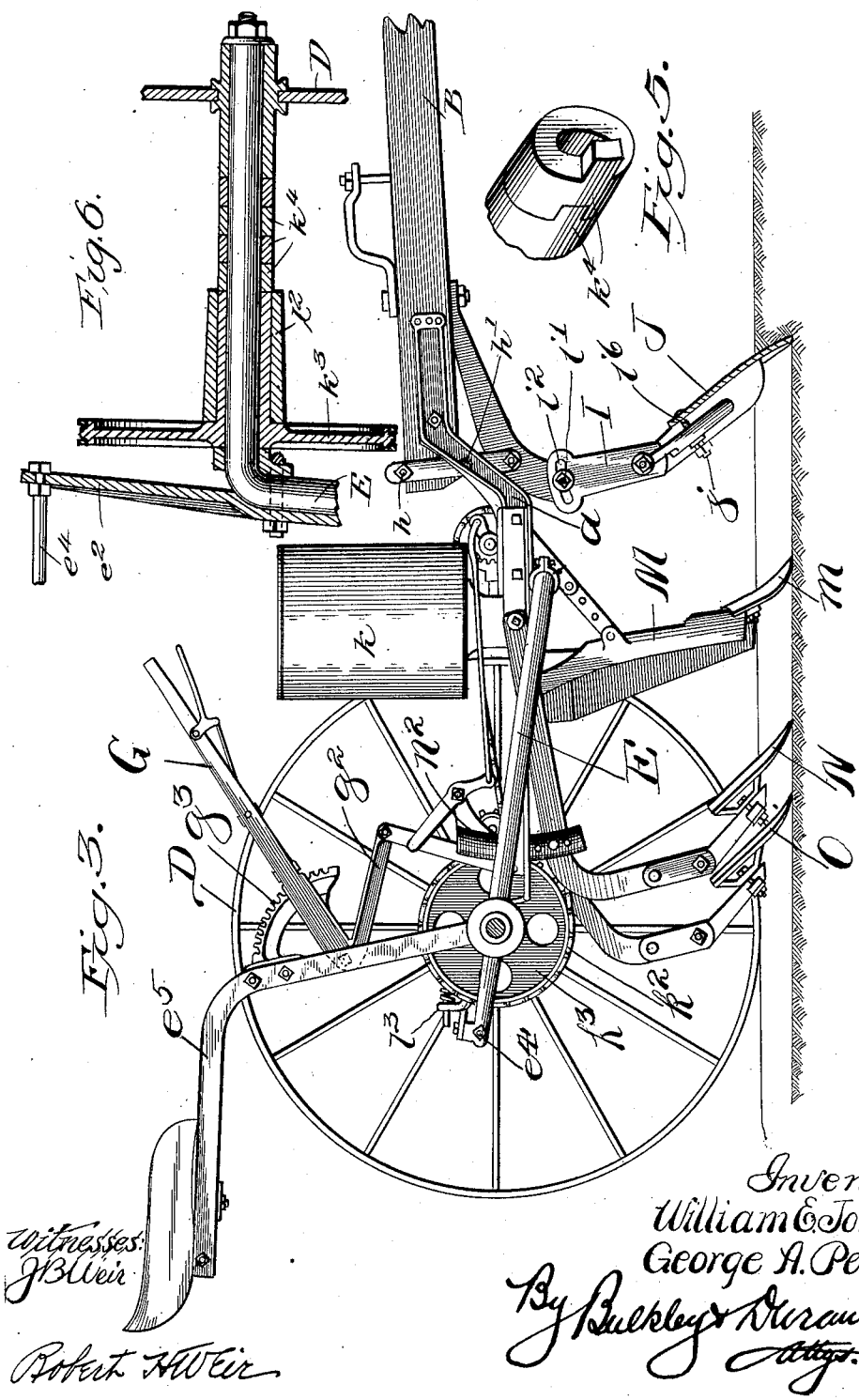

WILLIAM E. JOHNSON AND GEORGE A. PENNOCK, OF ROCK ISLAND, ILLINOIS, ASSIGNORS TO ROCK ISLAND PLOW COMPANY, OF ROCK ISLAND, ILLINOIS, A CORPORATION OF ILLINOIS.

PLANTING-MACHINE.

1,093,991.

Specification of Letters Patent.

Patented Apr. 21, 1914.

Application filed July 30, 1904. Serial No. 218,797.

*To all whom it may concern:*

Be it known that we, WILLIAM E. JOHNSON and GEORGE A. PENNOCK, both citizens of the United States of America, and residents of Rock Island, Rock Island county, Illinois, have invented a certain new and useful Improvement in Planting-Machines, of which the following is a specification.

Our invention relates to planting machines in general, but more particularly to planting machines of that character in which the seed-dropping mechanism and other parts are carried by or suitably connected with vehicle wheels, and especially to planting machines for use in planting cotton.

Generally stated, the object of our invention is to provide an improved, simplified, and highly efficient planting machine.

Certain special objects are to provide an improved construction and arrangement whereby a bail-shaped axle may be employed in a machine of this particular character as a means for swingingly connecting the vehicle wheels with the body-frame of the machine; to obtain increased efficiency, particularly with respect to the means for covering the seed which has been dropped in the furrow, by providing a plurality of shovel-beams having suitable shovels, and whereof each is adapted for free and independent up-and-down swing, thereby permitting the shovel or shovels at one side of the furrow to have a free up-and-down swinging or floating action independently of the shovel or shovels at the other side of the furrow, and thus insuring better results with respect to rough or uneven ground; to provide an improved construction and arrangement of the members constituting the body-frame; to provide an improved connection between the body-frame and the bail-shaped axle, whereby the shovels may be readily raised from the ground, and whereby the body-frame may be locked against movement relatively to the axle and vehicle wheels; and to provide certain details and features of improvement tending to increase the general efficiency and serviceability of a planting machine of this particular character.

In the accompanying drawings, Figure 1 is a top plan of a planting machine embodying the principles of our invention; Fig. 2 is a side elevation of the left-hand side of the said planting machine, the near wheel being removed in order to more clearly show the chain-tightener arrangement at this side of the machine; Fig. 3 is a side elevation of the righthand side of the machine shown in Fig. 1, the near wheel being removed for convenience of illustration; Fig. 4 is an enlarged detail view of one of the shovel beams, showing the spring for yieldingly holding the shovel in the ground; Fig. 5 is a detail perspective view of one of the collars employed for connecting one of the vehicle wheels with the sprocket-wheel which drives the chain through which power is communicated to the seed-dropping mechanism; and Fig. 6 is an enlarged horizontal-section through the hub-portion of the left-hand vehicle-wheel, and also through the adjacent sprocket-wheel and other parts, showing the end portion of the bail-shaped axle in plan.

As thus illustrated, our invention comprises a suitable body-frame A, preferably composed of a U-shaped member having its forward ends secured to brackets $a$. These brackets are, it will be observed, preferably secured at their upper and forward ends to opposite sides of the tongue B. It will also be seen that the substantially rectangular and longitudinally extending body-frame thus provided is desirably somewhat wider than the said tongue. Preferably, the entire machine is adapted to be supported by two vehicle wheels C and D, arranged at opposite sides of the rear end of the body-frame, and of a size to support the latter in a suitably elevated position. As a feature of special improvement, the said vehicle wheels are connected with the forward portion of the body-frame through the medium of a bail-shaped axle E; and it will be seen that the middle or forward portion $e$ of said axle is mounted to oscillate in bearings $e^1$ carried by the body-frame, while the spindles or outer end-portions of the said axle are adapted to receive the hubs of the said vehicle wheels. With this arrangement, it is obvious that a rocking motion on the part of the said axle will result in an up-and-down movement on the part of the body-frame, the object of which will hereinafter more fully appear.

The lifting of the body-frame and the necessary relative movement between the axle and the body-frame, may be accomplished by any suitable or desired means. For example, and as a simple and highly efficient arrangement for so doing, the said axle may be provided at its rear bends or corners with brackets $e^2$ secured in place by means of U-shaped bolts $e^3$. The rear ends of these brackets can be connected by a rod $e^4$, so as to render the axle structure strong and rigid. Also, as illustrated, a pair of seat-bars $e^5$ are secured at their lower ends to the said brackets $e^2$, these seat-bars being preferably spread or bent apart at their lower ends, but brought together at their upper ends, and extending rearwardly and horizontally in such manner as to provide a suitable support for the driver's seat F. The portion of the axle structure thus composed of the said seat-bars is then preferably connected with the body-frame through the medium of a bell-crank shaped hand-lever G, and a pair of links $g$. As illustrated, the corner or elbow of the said bell-crank shaped lever is positioned between the two seat-bars and pivotally mounted thereto at a point $g^1$, substantially midway between the upper and lower ends of said bars. The said links $g$, which converge upwardly, have their upper ends secured to the forward end of the short arm $g^2$ of said hand-lever, while their lower ends are pivoted to opposite sides of the body-frame. A toothed rack $g^3$, of well-known form, is also secured to the seat-bars and arranged in position to be engaged by the usual bolt or dog $g^4$ on the said hand-lever. In this way, it is obvious that the driver, while occupying the seat F, can reach forward and manipulate the lever G for the purpose of either raising or lowering the body-frame. The bolt or dog on the said hand-lever, and the toothed rack $g^3$, constitute the means for then locking the body-frame in any desired position relatively to the axle structure.

The sweep-beam H has its upper and forward end bolted to the underside of the tongue B, as shown more clearly in Figs. 2 and 3, and is braced by means of a pair of brace bars $h$ having their lower ends secured to opposite sides of said beams, and their upper end portions clamped to opposite sides of the said tongue. Bolts $h^1$, passing through the said brace-bars at points above and below the end-portion of the tongue, may constitute the means for clamping the said brace bars to opposite sides of the tongue.

The sweep-shank I is preferably provided with a bifurcated upper end-portion adapted to receive the lower end-portion of the sweep-beam. A pivot bolt $i$ extends through the lower end-portion of the sweep-beam, and through the embracing portions of the sweep-shank, while another bolt $i^1$ extends through the upper end-portions of the sweep-shank and through the sweep-beam. It will be observed that the upper end-portions of the sweep-shank are provided with horizontally disposed slots $i^2$, through which the bolt $i^1$ passes, and that consequently the position of the sweep-shank relative to the sweep-beam may be changed or adjusted to suit the conditions or requirements of any particular case.

The sweep J, or "middle breaker" as it is sometimes called, of any suitable known or approved form, is secured to the lower end-portion of the sweep-shank by means of a single bolt $j$.

The hopper K is adapted to contain the seed, and is, it will be understood, provided at its bottom with seed-dropping mechanism of any suitable, known or approved character (not shown). Preferably, however, the said seed-dropping mechanism is operated through the medium of a transversely disposed shaft $k$, mounted in bearings on the body-frame and arranged immediately in front of the said hopper. It will be understood that any suitable power transmitting connection can be employed between said shaft and the operative parts of the seed-dropping mechanism, and that any suitable arrangement can be employed for controlling the transmission of power to the seed dropping mechanism, so as to enable the driver to start and stop the dropping mechanism at will.

As illustrated, the shaft $k$ is driven from the vehicle wheel D through the medium of a sprocket-wheel $k^1$, a sprocket-chain $k^2$, and a second sprocket-wheel $k^3$. It will be seen that the sprocket-wheel $k^1$ is secured to the shaft $k$, while the sprocket-wheel $k^3$ is provided with an elongated hub and mounted to rotate upon the end-portion of the axle E, as shown more clearly in Fig. 6. Preferably, and in order that the distance between the two vehicle-wheels may be varied at will, the hub of the sprocket-wheel $k^3$ is connected with the hub of the vehicle-wheel through the medium of a number of interlocking sleeves $k^4$, as shown in Fig. 5. In this way, the vehicle-wheel D drives the sprocket-wheel $k^3$, and the transmission of power is then communicated forward through the sprocket-chain and the other sprocket-wheel, and through the shaft $k$ to the seed-dropping mechanism. With this arrangement, it will be seen that the axle E and the said chain $k^2$ are adapted to swing up and down about non-coincident axes, inasmuch as the shaft $k$ is above and slightly forward of the middle or forward portion $e$ of the said axle. Consequently, a rise and fall on the part of the body-frame relatively to the axle structure tends to vary the distance between the two sprocket-wheels; and for this reason an improved and highly efficient belt tightener is provided, and adapted to maintain a constant tension regardless of the position of the machine or the spread of the chain. The said belt-tightener comprises the small roll L, mounted upon the forward end of a small bell-crank shaped lever $l$, the latter having its elbow pivoted at $l^1$ to a hollow casting or support $l^2$. This casting or support $l^2$ is, it will be seen, fitted upon the elongated hub of the sprocket-wheel $k^3$, and provided with an extension $l^3$, which is connected in a suitable manner with the adjacent bracket $e^2$. In this way, the said casting or supporting member $l^2$ is supported upon the rotary hub of the said sprocket-wheel, but in such manner that it is practically rigid with the axle structure. The shorter arm of the said lever $l$ is connected with the casting $l^2$ by means of an I-bolt $l^4$, and by means of the coil-spring surrounding said I-bolt and interposed between the said lever $l$ and the upturned end portion of the extension $l^3$ of the casting $l^2$. With this arrangement, the spring $l^5$ exerts its tension in a direction to cause the roll L to bear constantly on the upper portion of the sprocket-chain, so as to keep the chain tight regardless of the position of the machine.

It will be seen that a spout M leads downwardly from the seed-dropping mechanism, and is provided with a furrow-opener $m$, the same being arranged in rear of the sweep J.

The means for covering the seed dropped into the furrow constitutes an important feature of our invention, and comprises the covering shovels N and O, the former being positioned at the right of the furrow and somewhat forward of the latter. In other words, two covering shovels are arranged at opposite sides of the furrow in which the seed is dropped; and they are secured in any suitable manner to the lower and rear ends of the shovel-beams $n$ and $o$, which are preferably of goose-neck form, and which have their forward ends pivotally secured to the opposite sides of the body-frame. As illustrated, the beam $o$ is pivotally secured to the body-frame at $o^1$, whereas the beam $n$ is pivotally secured to the opposite side of the body-frame at $n^1$. The free swinging or floating shovel-beams thus provided and adapted for up-and-down swinging movement during the operation of the machine are held against lateral movement by brackets $n^2$ and $o^2$, each having a vertical slot in which its allotted shovel beam may move up and down, as shown more clearly in Fig. 4. The lower end-portion of each bracket, as, for example, the lower end-portion $n^3$ of the bracket shown in Fig. 4, constitutes a stop for limiting the downward movement of the shovel-beam. In each case, it will also be seen that the upward movement of the shovel-beam is yieldingly opposed by a coil-spring $n^4$ interposed between the beam and the upper end-portion of the bracket $n^2$, these springs for yieldingly holding the covering shovels in the ground being positioned in the slots in which the shovel beams move up and down. If desired, pins can be provided for locking the shovel-beams against movement relatively to the body-frame, as, for example, the pin $n^5$ shown in Fig. 4. This pin is inserted through the beam $n$ and the bracket $n^2$, the latter being provided with a series of holes permitting the position of the beam relatively to the bracket to be varied within limits. In this way, the two shovel-beams carrying the shovels are each adapted for free and independent rise and fall, each one having a floating action independently of the other; but, at the same time, either beam, or both of them, can be locked and made rigid with the body-frame. With provision of this character, it is obvious that each covering shovel,—that is to say, the shovel or shovels at each side of the furrow—may have an easy rise and fall independently of all other shovels, and according to the character of the ground over which it is traveling. If a machine is traveling on a ridge, the shovel at one side of the furrow may assume a position lower than the shovel at the other side of the furrow, thereby making it unnecessary for one shovel to drag deeper than is necessary, and impossible for one shovel to hold the other above the surface of the ground. In other words, the covering means at opposite sides of the furrow act independently of each other, and thereby insure increased efficiency and effective covering of the seed, regardless of the character of the ground over which the machine is traveling.

As previously explained, the position of the machine is changed by manipulating the hand-lever G. When this lever is pulled toward the driver's seat, the body-frame is lifted and the shovels are lifted out of the ground.

What we claim as our invention is:—

1. A planting machine comprising a body-frame, a tongue rigid with said body-frame, a furrow-opener carried by the body-frame, seed-dropping mechanism carried by the body-frame and provided with means for dropping the seed in the furrow made by said opener, vehicle wheels swingingly connected with the body-frame, a manually operated device for locking the said wheels against bodily movement relatively to the body-frame, and a plurality of shovel-beams swingingly connected with the said body-frame on opposite sides of and to the rear of said seed dropping mechanism, said beams being each adapted for free independent up-and-down swinging movement, and each beam having a shovel for covering the seed dropped in said furrow.

2. A planting machine comprising a body-frame, a tongue rigid with said body-frame, a single-furrow seed-dropping mechanism carried by said body-frame, a bail shaped axle having its middle portion mounted to oscillate in bearings carried by said body-frame, vehicle wheels mounted on the spindles of said axle, and a plurality of independently free-swinging covering shovels carried by the body-frame, and located on opposite sides of and to the rear of said seed dropping mechanism.

3. A planting machine comprising a body-frame, seed-dropping mechanism carried by said body-frame, covering shovels carried by said body frame connected to swing up and down relatively to the body-frame, on opposite sides of the furrow, a bail-shaped axle swingingly connected with the body-frame, and vehicle wheels on said axle.

4. A planting machine comprising a body-frame, a tongue rigid with said body-frame, a bail-shaped axle swingingly connected with the body-frame and provided with vehicle wheels, a driver's seat rigidly mounted on the said axle, means including a bell-crank-shaped hand-lever for both producing relative movement between the body-frame and the axle and locking same against relative movement, seed-dropping mechanism carried by the body-frame, means for opening a furrow in which to drop the seed, and a plurality of free-swinging or floating beams whereof each is adapted for independent rise and fall, and whereof each is provided with a suitable shovel for covering the seed.

5. A planting machine comprising a tongue, a body-frame rigidly connected with the rear end of said tongue, seed-dropping mechanism, vehicle wheels swingingly connected with the body-frame, a sweep-beam secured to the under side of the tongue, two brace-bars having their lower end-portions secured to said sweep-beam and their upper portions disposed at opposite sides of said tongue, clamping bolts extending through said brace-bars above and below the tongue, a sweep-shank adjustably secured to said sweep-beam, a sweep secured to said sweep-shank, and free swinging covering shovels.

6. A planting machine comprising a body-frame, a tongue rigidly connected to said body-frame, seed-dropping mechanism carried by the body-frame, a sweep secured to the tongue, a furrow-opener in rear of said sweep, swingingly connected covering shovels in rear of said furrow-opener, a bail-shaped axle swingingly connected with the body-frame, a pair of upwardly extending seat-bars secured to said axle, a seat on said seat-bars, a bell-crank-shaped hand lever pivotally mounted upon said seat-bars, means for locking said hand lever in different positions, and a pair of links connecting the shorter arm of said hand lever with the side portions of said body-frame.

7. A planting machine comprising a tongue, a rearwardly extending frame rigidly secured to the said tongue, a bail-shaped axle having its forward middle portion mounted to turn in bearings on said frame, whereby said frame extends rearwardly between the side portions of said bail-shaped axle, wheels on said axle, a sweep carried by the tongue, a hopper and seed-dropping mechanism mounted on said frame in rear of the said middle portion of the said bail-shaped axle, a furrow-opener also carried by said frame and extending downwardly from the seed-dropping mechanism, swingingly connected covering shovels carried by the said frame and arranged in rear of the furrow-opener, a power-transmitting connection between one of said wheels and the dropping mechanism, a driver's seat carried by the bail-shaped axle, and manually operated connections between the bail-shaped axle and frame, whereby the frame and axle may be adjusted relatively and the sweep, furrow-opener and covering shovels thereby raised or lowered.

8. In a planting machine, the combination of a pole or tongue, a frame rigid with said pole or tongue, a crank-axle journaled in bearings near the said pole or tongue, a sweep just forward of the middle portion of said axle, a seed box and dropping mechanism just in rear of said middle portion of the axle, a spout and furrow opener extending down from said dropping mechanism, supporting wheels on the rear out-turned end portions of said axle, a sprocket wheel on said axle, connection between the sprocket wheel and one of said supporting wheels, a sprocket chain connecting the sprocket wheel with the dropping mechanism, a plurality of free swinging and floating covering shovels carried by the said frame, seat bars rigidly mounted on the axle back of the seed box, a seat on said bars, a lever pivoted between the seat bars, and connection by which the lever is operative to raise and lower the frame and parts carried thereby.

Signed by us at Rock Island, Rock Island county, Illinois, this 19 day of July, 1904.

WILLIAM E. JOHNSON.
GEORGE A. PENNOCK.

Witnesses:
A. B. FRENIER,
GRACE M. BROMLEY.